(12) United States Patent
Hahn et al.

(10) Patent No.: US 8,251,443 B1
(45) Date of Patent: Aug. 28, 2012

(54) VEHICLE ARMREST STRADDLING APPARATUS FOR SUPPORT OF OBJECTS THEREON

(76) Inventors: Nancy Hahn, Fort Pierce, FL (US);
James Hahn, Fort Pierce, FL (US)

(*) Notice: Subject to any disclaimer, the term of this patent is extended or adjusted under 35 U.S.C. 154(b) by 80 days.

(21) Appl. No.: 12/941,322

(22) Filed: Nov. 8, 2010

(51) Int. Cl.
*A47C 7/62* (2006.01)
*B60R 7/00* (2006.01)

(52) U.S. Cl. .................. 297/188.18; 224/275

(58) Field of Classification Search ............. 297/188.18, 297/188.19; 224/275; 248/311.2
See application file for complete search history.

(56) References Cited

U.S. PATENT DOCUMENTS

| | | | |
|---|---|---|---|
| D232,871 S | 9/1974 | George | |
| 4,575,149 A * | 3/1986 | Forestal et al. | 297/145 |
| 4,756,459 A * | 7/1988 | Hardman | 224/275 |
| 4,795,210 A | 1/1989 | Milat | |
| 4,938,401 A * | 7/1990 | Weisbrodt et al. | 224/275 |
| 5,205,452 A | 4/1993 | Mankey | |
| 5,234,251 A * | 8/1993 | Ayotte | 297/188.14 |
| 5,516,191 A | 5/1996 | McKee | |
| 5,865,412 A * | 2/1999 | Mason | 248/311.2 |
| 5,979,987 A * | 11/1999 | Rich | 297/411.23 |
| 5,984,249 A * | 11/1999 | Cohen | 248/226.11 |
| 6,032,840 A | 3/2000 | Gregory | |
| 6,827,405 B1 * | 12/2004 | Roberts | 297/411.23 |
| 7,131,688 B2 * | 11/2006 | Steenson | 297/161 |
| 7,237,816 B1 | 7/2007 | Singh et al. | |
| 2005/0092793 A1 * | 5/2005 | Berggren | 224/275 |

* cited by examiner

*Primary Examiner* — Milton Nelson, Jr.
(74) *Attorney, Agent, or Firm* — Kyle Fletcher

(57) ABSTRACT

The vehicle armrest straddling apparatus for support of objects thereon includes a storage compartment under which a plurality of expandable legs attach. The apparatus is an accessory that straddles atop an armrest of a vehicle, and of which provides a place upon which objects may be stored. The expandable legs extend and retract via a slot to accommodate armrests of different sizes.

10 Claims, 4 Drawing Sheets

VEHICLE ARMREST STRADDLING APPARATUS FOR SUPPORT OF OBJECTS THEREON

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of vehicle armrests, more specifically, an accessory that straddles upon an armrest of a vehicle and of which can support items thereon.

B. Discussion of the Prior Art

As will be discussed immediately below, no prior art discloses a vehicle armrest accessory that rests atop and straddles a center armrest of a vehicle and of which includes expandable legs that adjust to accommodate armrests of differing sizes; wherein the accessory features a storage compartment that can support a purse or handbag thereon while inside of a vehicle.

The Singh Patent (U.S. Pat. No. 7,237,816) discloses an automotive center console comprising a storage area that console and not an accessory that rests atop and straddles an existing console of differing sizes in different vehicles.

The Gregory Patent (U.S. Pat. No. 6,032,840) discloses an accessory for an automobile adapted to cover the armrest structure, which is capable of holding various objects such as a wallet. However, the accessory does not feature expandable legs to accommodate differently sized armrests or include an open-top design for simply laying a purse or handbag thereon when in use in a vehicle.

The McKee Patent (U.S. Pat. No. 5,516,191) discloses a desk structure that is to be substituted for the conventional arm rest of a vehicle having cavities for receiving a variety of accessories. However, the desk structure is not an accessory that straddles atop an armrest to provide a storage compartment for resting items thereon.

The Mankey Patent (U.S. Pat. No. 5,205,452) discloses a portable car console having an adjustable foot so that the console can be placed and leveled on different kinds of car seats despite their different slopes and shapes. However, the console is not suited for straddling atop an armrest or include expandable legs that can adjust for differently sized armrests.

The Milat Patent (U.S. Pat. No. 4,795,210) discloses a portable table for use in vehicles that may be supported on an armrest of the vehicle. Again, the portable table is not suited for straddling upon an armrest, and also does not include expandable legs.

The George et al. Patent (U.S. Pat. No. Des. 232,871) illustrates a design of an article receptacle for vehicles, which does not have expandable legs.

While the above-described devices fulfill their respective and particular objects and requirements, they do not describe a vehicle armrest accessory that rests atop and straddles a center armrest of a vehicle and of which includes expandable legs that adjust to accommodate armrests of differing sizes; wherein the accessory features a storage compartment that can support a purse or handbag thereon while inside of a vehicle. In this regard, the vehicle armrest straddling apparatus for support of objects thereon departs from the conventional concepts and designs of the prior art.

SUMMARY OF THE INVENTION

The vehicle armrest straddling apparatus for support of objects thereon includes a storage compartment under which a plurality of expandable legs attach. The apparatus is an accessory that straddles atop an armrest of a vehicle, and of which provides a place upon which objects maybe stored. The expandable legs extend and retract via a slot to accommodate armrests of different sizes.

It is an object of the invention to provide an accessory for an armrest that straddles atop said armrest and of which enables objects to be stored thereon.

A further object of the invention is to provide a storage compartment that has an open box design such that objects, such as purses or handbags, are placed atop the storage compartment.

A further object of the invention is to provide expandable legs that extend and retract under the storage compartment to support the accessory on armrests of different sizes.

These together with additional objects, features and advantages of the vehicle armrest straddling apparatus for support of objects thereon will be readily apparent to those of ordinary skill in the art upon reading the following detailed description of presently preferred, but nonetheless illustrative, embodiments of the vehicle armrest straddling apparatus for support of objects thereon when taken in conjunction with the accompanying drawings.

In this respect, before explaining the current embodiments of the vehicle armrest straddling apparatus for support of objects thereon in detail, it is to be understood that the vehicle armrest straddling apparatus for support of objects thereon is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle armrest straddling apparatus for support of objects thereon.

It is therefore important that the claims be regarded as including such equivalent construction insofar as they do not depart from the spirit and scope of the vehicle armrest straddling apparatus for support of objects thereon. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
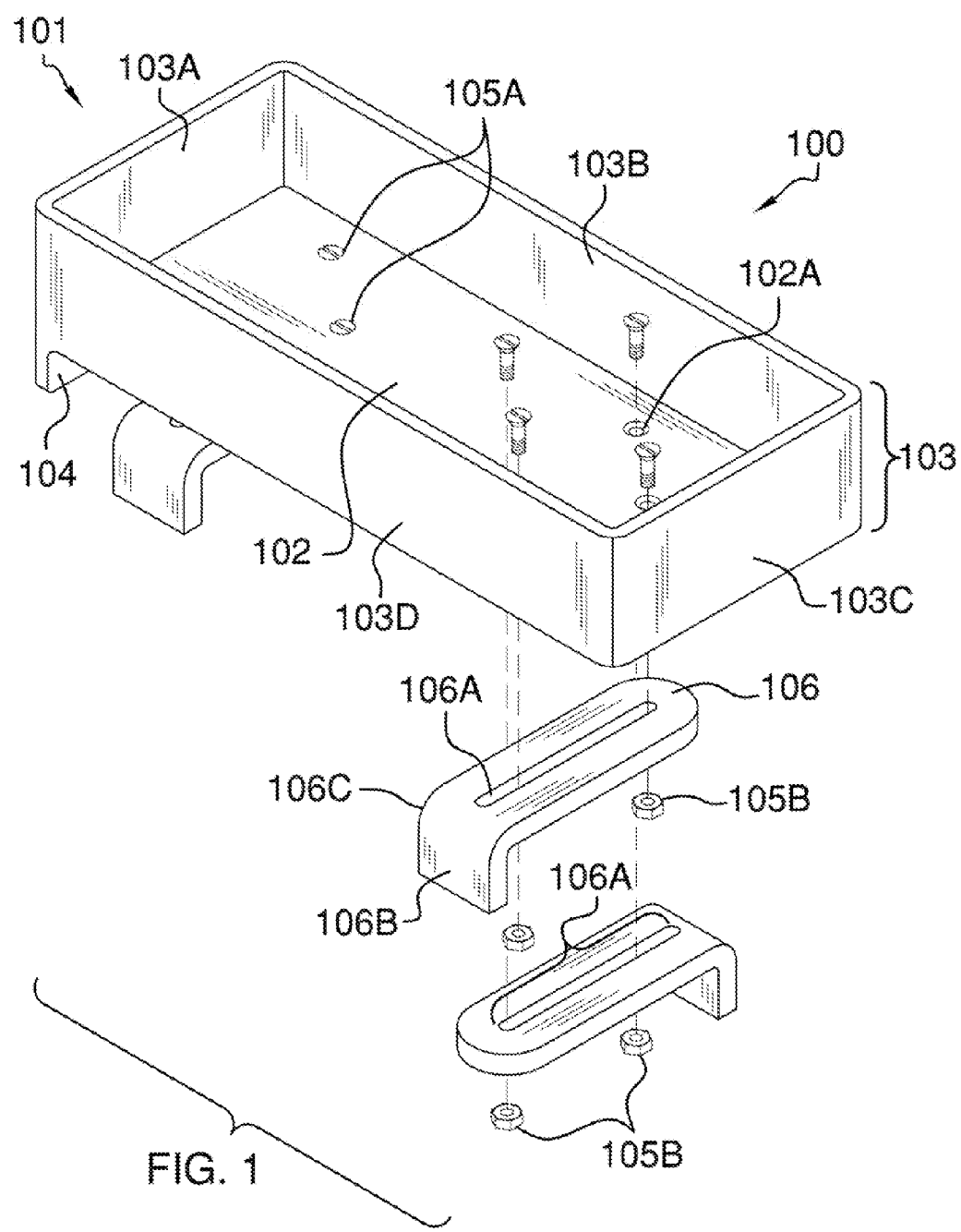
FIG. 1 illustrates a front, isometric view of the vehicle armrest straddling apparatus for support of objects thereon by itself and in an exploded state.
Figure 2:
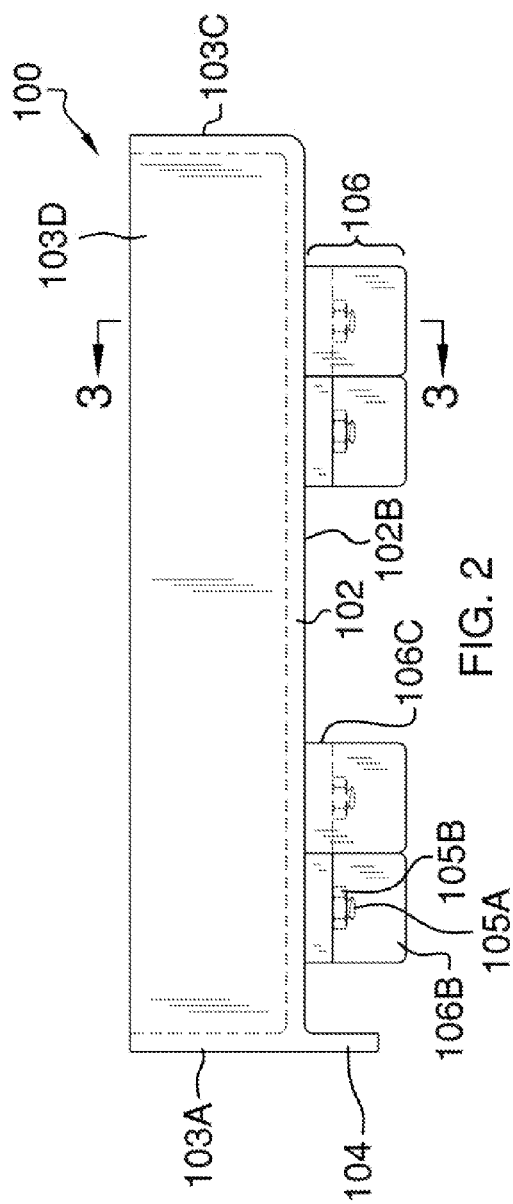
FIG. 2 illustrates a side view detailing the plurality of adjustable legs that attach under storage compartment.
Figure 3:
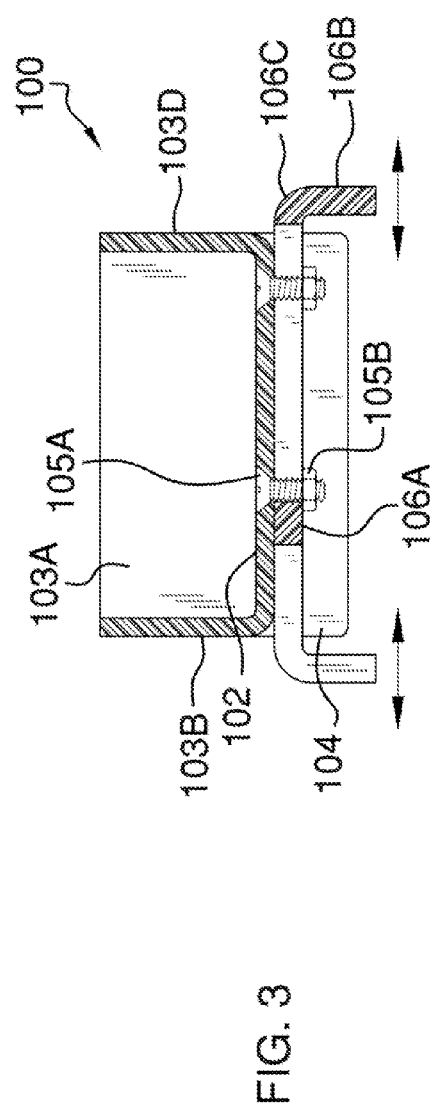
FIG. 3 illustrates a cross-sectional view of the vehicle armrest straddling apparatus for support of objects thereon along line 3-3 in FIG. 2, and detailing the expandable legs and mounting hardware for securing the expandable legs under the storage compartment.
Figure 4:
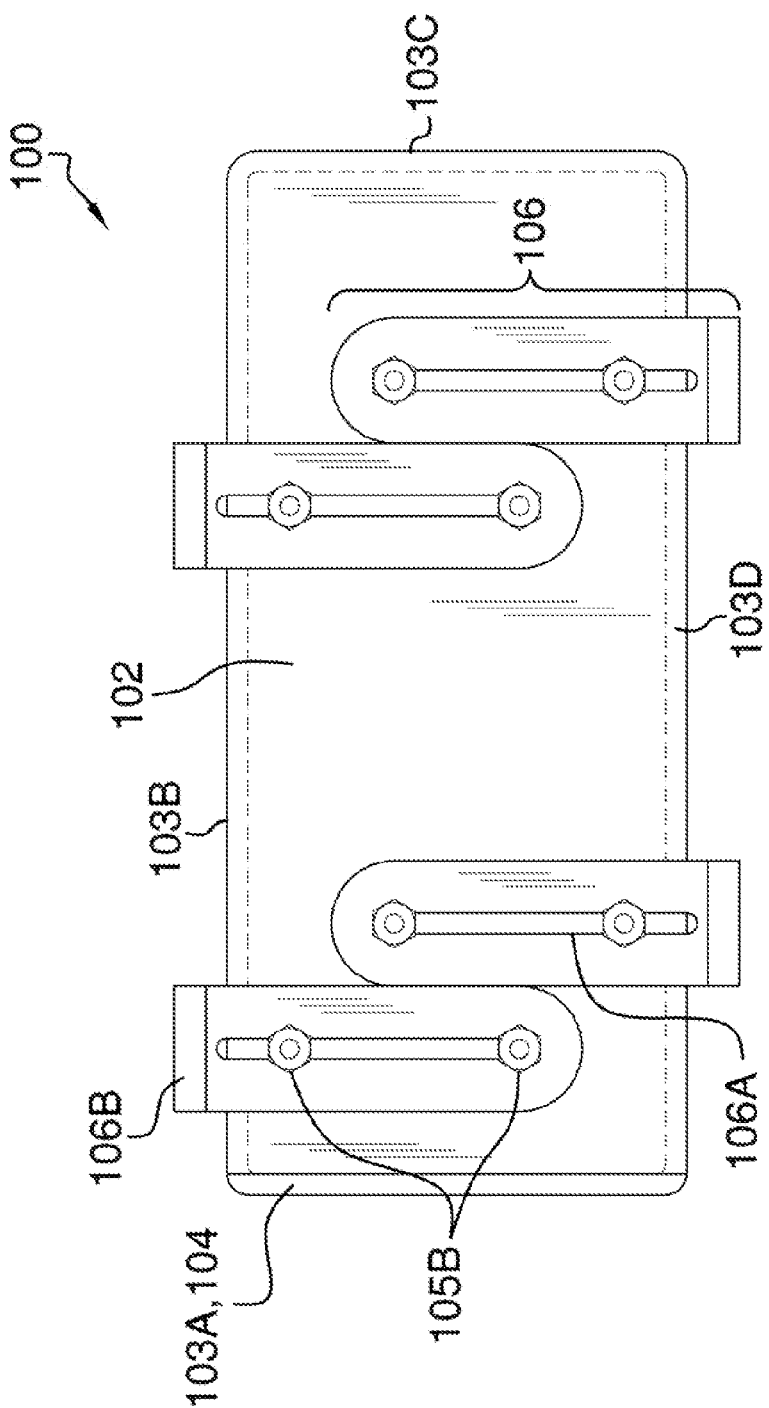
FIG. 4 illustrates a bottom view of the vehicle armrest straddling apparatus for support of objects thereon and detailing the slot that enables lateral movement of the expandable legs under the storage compartment.
Figure 5:
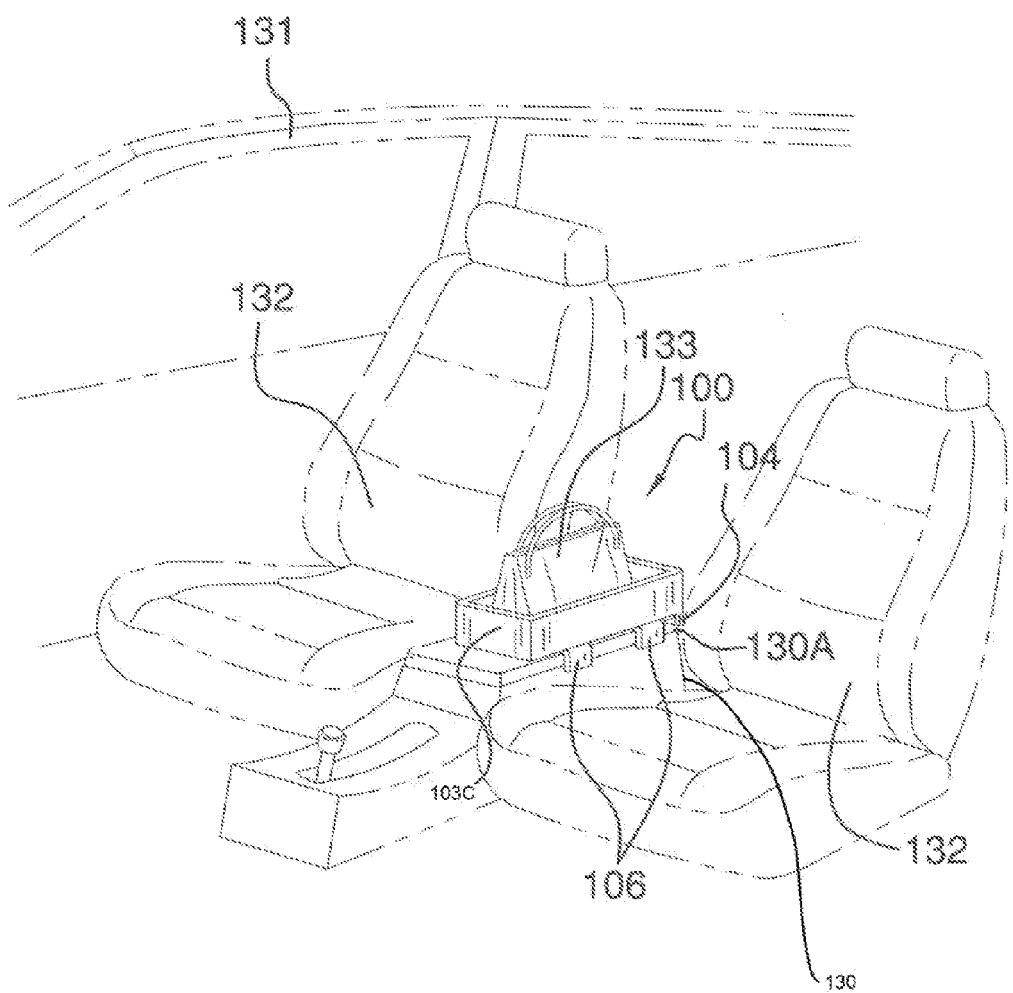
FIG. 5 illustrates a view of the vehicle armrest straddling apparatus for support of objects thereon in use with an armrest inside of a vehicle.

Detailed reference will now be made to the preferred embodiment of the present invention, examples of which are illustrated in FIGS. 1-5. A vehicle armrest straddling apparatus for support of objects thereon 100 (hereinafter invention) includes a storage compartment 101 that is comprised of a bottom 102, sides 103, and a lip 104. The sides 103 are further defined by a first side 103A, a second side 103B, a third side 103C, and a fourth side 103D.

The lip 104 is provided to ensure that the invention 100 is properly oriented and placed atop an armrest 130 of a vehicle 131. The lip 104 abuts a back side 130A of the armrest 130. The armrest 130 may be referred to as a console, but is usually the object seated in between the two front seats 132 of the vehicle 131.

The lip 104 is designed to insure that the invention 100 does not move forwards with respect to the armrest 130 during sudden braking of the vehicle 131. Also, it shall be noted that the lip 104 descends from below the first side 103A.

The sides 103 form an enclosure into which a purse 133 may be placed thereon. The purse 133 may be a handbag or any other object for that matter. The purse 133 is to be placed atop the bottom 102 of the storage compartment 101, and to be confined thereon via the sides 103 of the storage compartment 101.

The bottom 102 features a plurality of holes 102A that are for use in receiving bolts 105A. The holes 102A are located at predefined locations on the bottom 102 and provide for a means of securing expandable legs 106 under the storage compartment 101.

The expandable legs 106 secure to a bottom side 102B of the bottom 102 via the bolts 105A and nuts 105B. The expandable legs 106 each include a slot 106A that runs a portion of the overall length of the expandable legs 106. The slots 106A enable the expandable legs 106 to extend and retract under the storage compartment 101.

The expandable legs 106 include arms 106B that extend down via a bend 106C. The arms 106B interact with the armrest 130 to further secure the invention 100 atop the armrest 130. The arms 106B act to restrain the invention 100 atop the armrest 130.

The storage compartment 101 and the expandable legs 106 may be made of a material comprising a plastic, metal, wood, carbon fiber composite, or ceramic.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A vehicle armrest straddling apparatus for support of objects thereon comprising:
    a storage compartment under which a plurality of expandable legs attach;
    wherein the storage compartment straddles atop an armrest seated between two front seats of a vehicle;
    wherein an object may be rested atop the storage compartment;
    wherein the storage compartment is further defined as a bottom, sides, and a lip;
    wherein the sides are further defined as a first side, second side, third side, and fourth side;
    wherein the lip extends from below the first side;
    wherein the lip abuts a back side of the armrest in order to prevent movement of the storage compartment during sudden braking of the vehicle.

2. The vehicle armrest straddling apparatus for support of objects thereon as described in claim 1 wherein the bottom has a plurality of holes into which bolts extend in order to secure the expandable legs under the storage compartment.

3. The vehicle armrest straddling apparatus for support of objects thereon as described in claim 2 wherein the expandable legs have slots that enable each expandable leg to extend and retract back and forth under the storage compartment in order to accommodate armrests of different sizes.

4. The vehicle armrest straddling apparatus for support of objects thereon as described in claim 3 wherein nuts screw onto the bolts in order to secure the expandable legs under a bottom surface of the bottom of the storage compartment.

5. The vehicle armrest straddling apparatus for support of objects thereon as described in claim 4 wherein objects are laid upon the bottom of the storage compartment and confined via the sides of the storage compartment.

6. A vehicle armrest straddling apparatus for support of objects thereon comprising:
    a storage compartment under which a plurality of expandable legs attach;
    wherein the storage compartment straddles atop an armrest seated between two front seats of a vehicle;
    wherein an object may be rested atop the storage compartment;

wherein the storage compartment is further defined as a bottom, sides, and a lip;

wherein the bottom has a plurality of holes into which bolts extend in order to secure the expandable legs under the storage compartment;

wherein the sides are further defined as a first side, second side, third side, and fourth side;

wherein the lip extends from below the first side;

wherein the lip abuts aback side of the armrest in order to prevent movement of the storage compartment during sudden braking of the vehicle.

7. The vehicle armrest straddling apparatus for support of objects thereon as described in claim 6 wherein the expandable legs have slots that enable each expandable leg to extend and retract back and forth under the storage compartment in order to accommodate armrests of different sizes.

8. The vehicle armrest straddling apparatus for support of objects thereon as described in claim 7 wherein nuts screw onto the bolts in order to secure the expandable legs under a bottom surface of the bottom of the storage compartment.

9. The vehicle armrest straddling apparatus for support of objects thereon as described in claim 8 wherein objects are laid upon the bottom of the storage compartment and confined via the sides of the storage compartment.

10. A vehicle armrest straddling apparatus for support of objects thereon comprising:

a storage compartment under which a plurality of expandable legs attach;

wherein the storage compartment straddles atop an armrest seated between two front seats of a vehicle;

wherein an object may be rested atop the storage compartment;

wherein the storage compartment is further defined as a bottom, sides, and a lip;

wherein the bottom has a plurality of holes into which bolts extend in order to secure the expandable legs under the storage compartment;

wherein the sides are further defined as a first side, second side, third side, and fourth side;

wherein the lip extends from below the first side, and abuts a back side of the armrest in order to prevent movement of the storage compartment during sudden braking of the vehicle;

wherein the expandable legs have slots that enable each expandable leg to extend and retract back and forth under the storage compartment in order to accommodate armrests of different sizes;

wherein nuts screw onto the bolts in order to secure the expandable legs under a bottom surface of the bottom of the storage compartment;

wherein objects are laid upon the bottom of the storage compartment and confined via the sides of the storage compartment.

\* \* \* \* \*